(12) United States Patent
Galstian et al.

(10) Patent No.: US 10,845,672 B2
(45) Date of Patent: Nov. 24, 2020

(54) LC BEAM BROADENING DEVICE WITH IMPROVED BEAM SYMMETRY

(71) Applicant: LensVector Inc., San Jose, CA (US)

(72) Inventors: Tigran Galstian, Quebec (CA); Vladimir Presniakov, Quebec (CA); Karen Asatryan, Quebec (CA); Armen Zohrabyan, Quebec (CA)

(73) Assignee: LENSVECTOR INC., San Jose, CA (US)

( * ) Notice: Subject to any disclaimer, the term of this patent is extended or adjusted under 35 U.S.C. 154(b) by 0 days.

(21) Appl. No.: 16/605,399

(22) PCT Filed: Apr. 20, 2018

(86) PCT No.: PCT/CA2018/050472
§ 371 (c)(1),
(2) Date: Oct. 15, 2019

(87) PCT Pub. No.: WO2018/191823
PCT Pub. Date: Oct. 25, 2018

(65) Prior Publication Data
US 2020/0050076 A1    Feb. 13, 2020

Related U.S. Application Data

(60) Provisional application No. 62/487,603, filed on Apr. 20, 2017.

(51) Int. Cl.
*G02F 1/1343* (2006.01)
*G02F 1/29* (2006.01)
*G02B 27/09* (2006.01)

(52) U.S. Cl.
CPC .......... *G02F 1/29* (2013.01); *G02B 27/0927* (2013.01); *G02F 1/134309* (2013.01); *G02F 2001/294* (2013.01)

(58) Field of Classification Search
CPC combination set(s) only.
See application file for complete search history.

(56) References Cited

U.S. PATENT DOCUMENTS

| | | | |
|---|---|---|---|
| 2010/0149444 A1 | 6/2010 | Hikmet et al. | |
| 2010/0208185 A1* | 8/2010 | Van Bommel | G02F 1/29 349/139 |
| 2015/0153580 A1* | 6/2015 | Fang | G02B 30/24 348/55 |

FOREIGN PATENT DOCUMENTS

| WO | 2017041167 A1 | 3/2017 |
|---|---|---|
| WO | 2018053640 A1 | 3/2018 |

OTHER PUBLICATIONS

International Search Report dated Oct. 25, 2018 for parent application No. PCT/CA2018/050472.

(Continued)

*Primary Examiner* — James A Dudek
(74) *Attorney, Agent, or Firm* — J-Tek Law PLLC; Jeffrey D. Tekanic; Scott T. Wakeman

(57) ABSTRACT

Liquid crystal light beam broadening devices and their manufacture are described. Beneficial aspects of beam broadening devices employed for controlled illumination and architectural purposes are presented including providing symmetric beam broadening, improving the beam intensity profile, beam divergence preconditioning and improving projected beam intensity uniformity. Both beam control devices having in-plane and homeotropic ground state liquid crystal alignment are presented.

11 Claims, 6 Drawing Sheets

(56) References Cited

OTHER PUBLICATIONS

Written Opinion dated Oct. 25, 2018 for parent application No. PCT/CA2018/050472.

* cited by examiner

LC BEAM BROADENING DEVICE WITH IMPROVED BEAM SYMMETRY

RELATED APPLICATIONS

This patent application claims priority from U.S. Provisional Patent Application Ser. No. US 62/487,603 filed Apr. 20, 2017, the entirety of which are incorporated herein by reference.

TECHNICAL FIELD

This patent application relates to liquid crystal (LC) beam broadening devices.

BACKGROUND

Applicant's International PCT patent application publication WO2017/041167 dated Mar. 16, 2017 (the specification of which is hereby incorporated by reference) discloses a variety of beam broadening LC devices. Such LC devices can be inexpensive and can be effective, for example, to broaden a beam of light for architectural lighting within a building. One such design option is described with reference to FIG. 20 in the said publication and is an LC cell having a homeotropic LC alignment in which the electrodes of the opposed cell substrates are orthogonally arranged.

In this configuration, each LC sandwich modulates light of a single polarization in two directions because the electric field created by the electrodes on each substrate orients the LC in a direction orthogonal to the extent of the strip electrodes. The LC in the middle of the cell is caused to twist between the two directions. The upper part of the cell acts on input light to split it into two linear polarizations with one such polarization of the beam of light undergoing a broadening in one direction (orthogonal to the electrode strip direction), while the part of the beam with the second (perpendicular) polarization passes through the upper part essentially without broadening, but the polarization is rotated by 90 degrees that is related to the twist in the LC in the middle of the cell that has been found to cause a rotation in the polarized light. Thus the bottom part of the cell acts on the light to have a broadening effect on of the same (first) polarization of the beam of light but this time in the orthogonal direction, while the other (second) polarization passes through the lower part largely unaffected.

Thus, a single LC sandwich acts essentially on a single polarization broadening it in two directions. Two such sandwiches can be arranged one after the other to act on two polarizations and in two directions. This is illustrated in FIG. 1A of the present application.

Another beam broadening configuration according to the prior art is known from WO2017/041167 in FIG. 6 and is shown in FIG. 1C of the present application. In this configuration, four cells are used. The array of electrodes provided on the cell inside surface of one substrate provides the control electric field for planar aligned LC. As illustrated, the alignment direction can be at 45 degrees with respect to the electrodes. Two cells have the same electrode orientation, such that the device acts on both linear polarizations (FIG. 1B).

SUMMARY

Applicant has discovered that the beam characteristics of a beam modulated by a device as illustrated schematically in FIGS. 1A and 1C can exhibit an intensity profile as illustrated in FIGS. 2 and 5, namely there can be intensity modulations (ripples) in the spatial distribution of beam intensity. The exact reason for this aberration is not fully understood. However, Applicant has discovered that the ripple in the intensity is reduced when the sandwiches or cells are arranged to be rotationally misaligned by a few degrees.

BRIEF DESCRIPTION OF THE DRAWINGS

The invention will be better understood by way of the following detailed description of embodiments of the invention with reference to the appended drawings, in which.

DETAILED DESCRIPTION

Figure 1A:
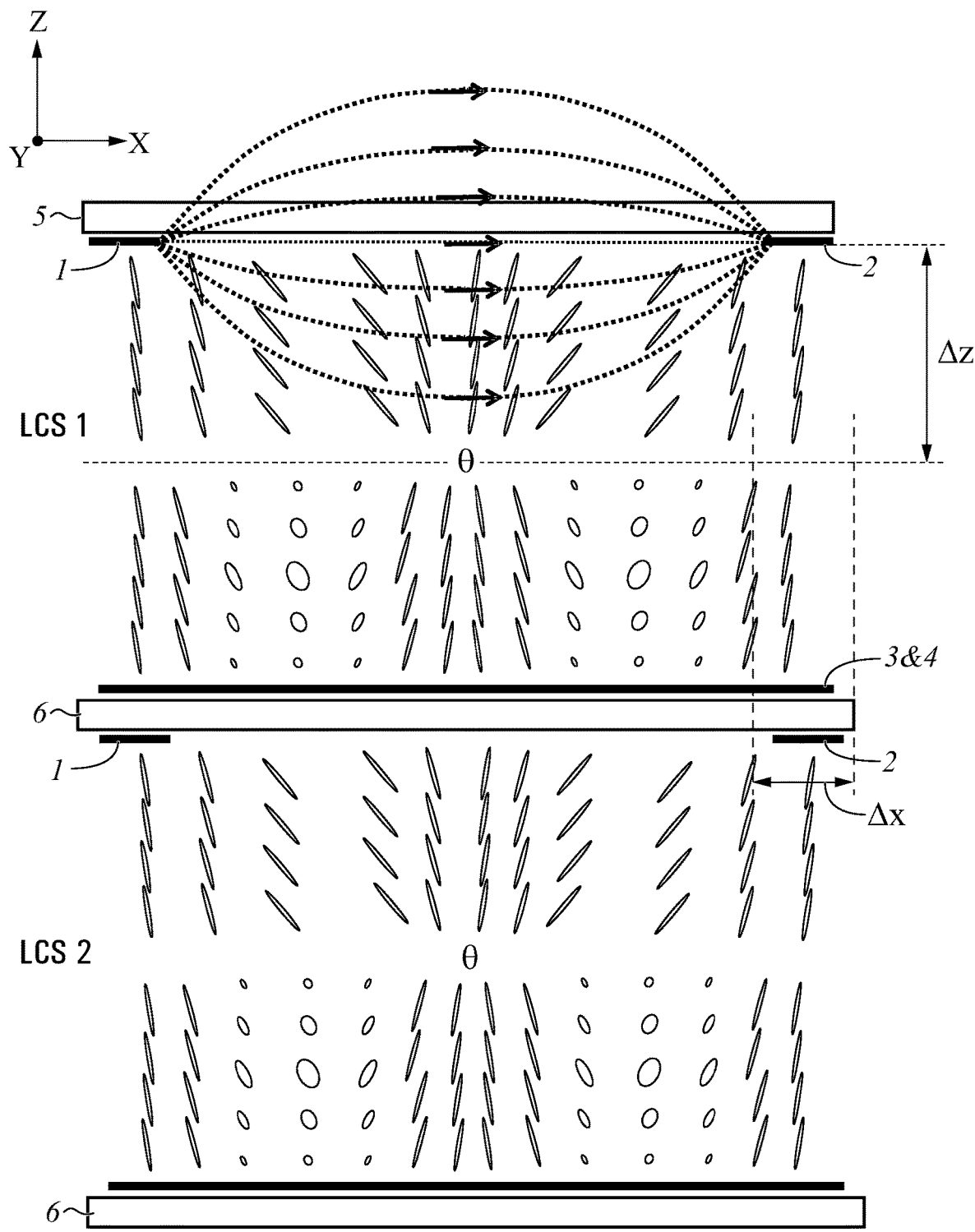
FIG. 1A is a schematic cross-sectional view of two LC sandwiches in which each sandwich has a homeotropic ground state LC alignment with the electrodes of the opposed cell substrates that are orthogonally arranged according to the prior art.
Figure 1B:
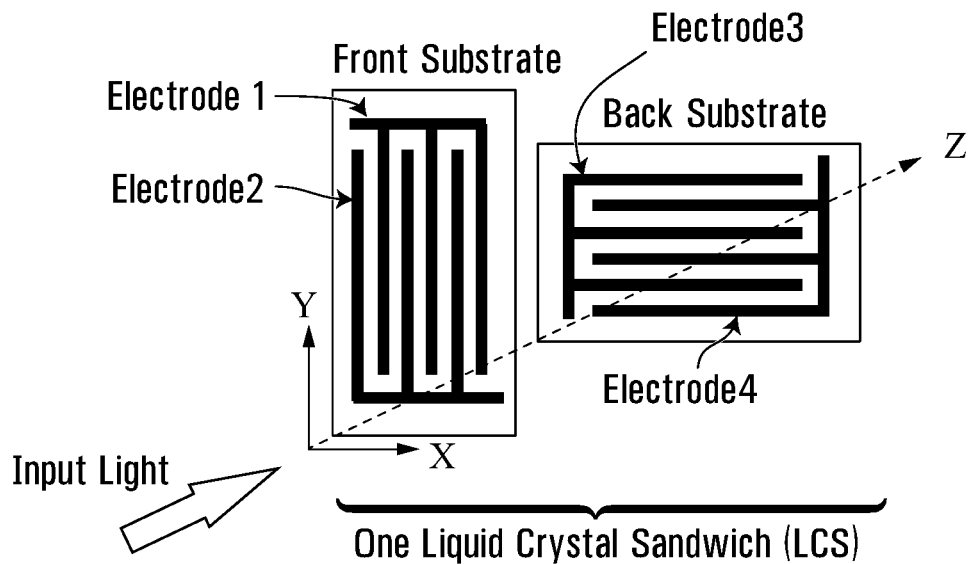
FIG. 1B is a schematic illustration of the substrate and electrode arrangement of a single LC sandwich according to FIG. 1A according to the prior art.
Figure 1C:
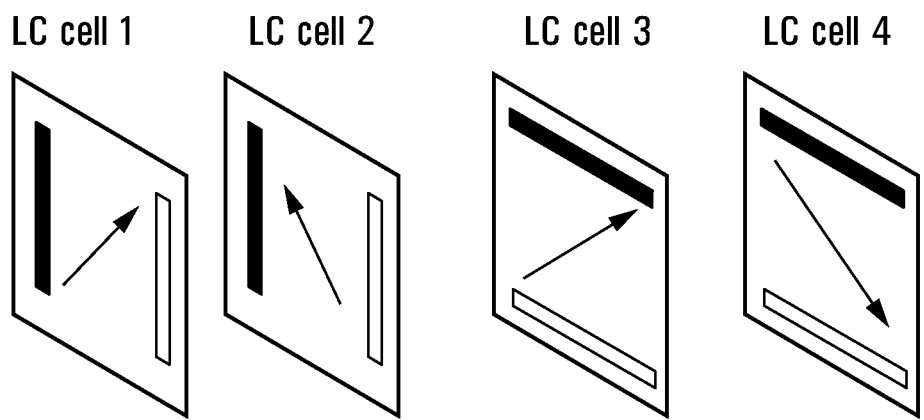
FIG. 1C is a schematic view of four LC cells having a planar ground state LC alignment according to the prior art.

As described above, the beam divergence control devices according to FIGS. 1A, 1B and 1C are known in the art and need not be described in greater detail herein. The aperture of such a device can be large enough to fill an aperture of light beam source, and thus it will be understood that a large number of small beam broadening strips disposed between parallel electrodes are active in modulating the beam over the aperture. In FIG. 1B, schematically a few such strips are illustrated.

Figure 2:
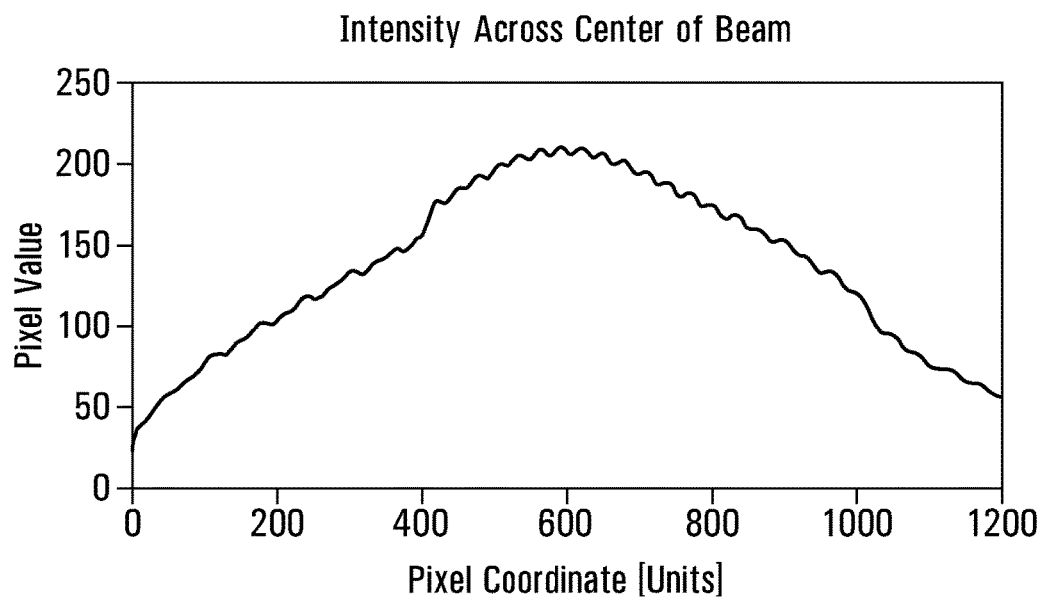
FIG. 2 is a plot of the beam intensity for a beam passing through a device according to FIG. 1A taken along a line passing through the transversal cross-section of the beam that shows a rippling effect in the beam intensity.
Figure 3:
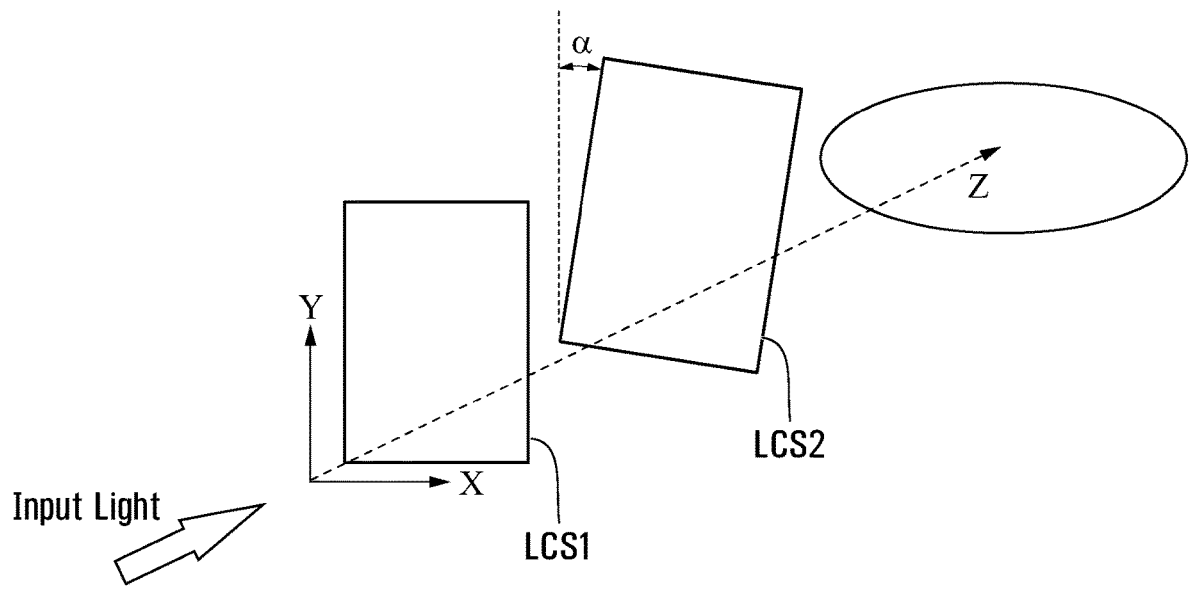
FIG. 3 is a schematic illustration of two LC sandwiches according to FIG. 1 in which a small angle rotation is provided between the LC sandwiches.
Figure 4:
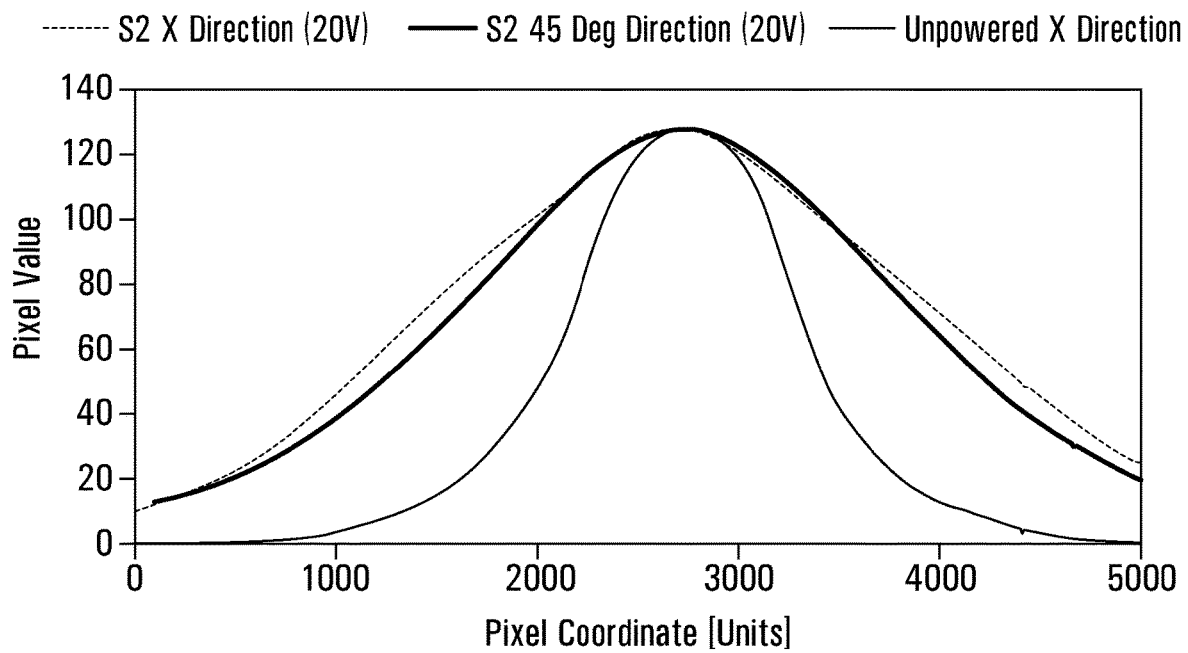
FIG. 4 is a plot of the beam intensity taken along horizontal and at 45 Degree lines passing through the transversal cross-section of the beam that shows how the rippling effect in the beam intensity is mitigated by the small angle rotation using the configuration of FIG. 3.
Figure 5:
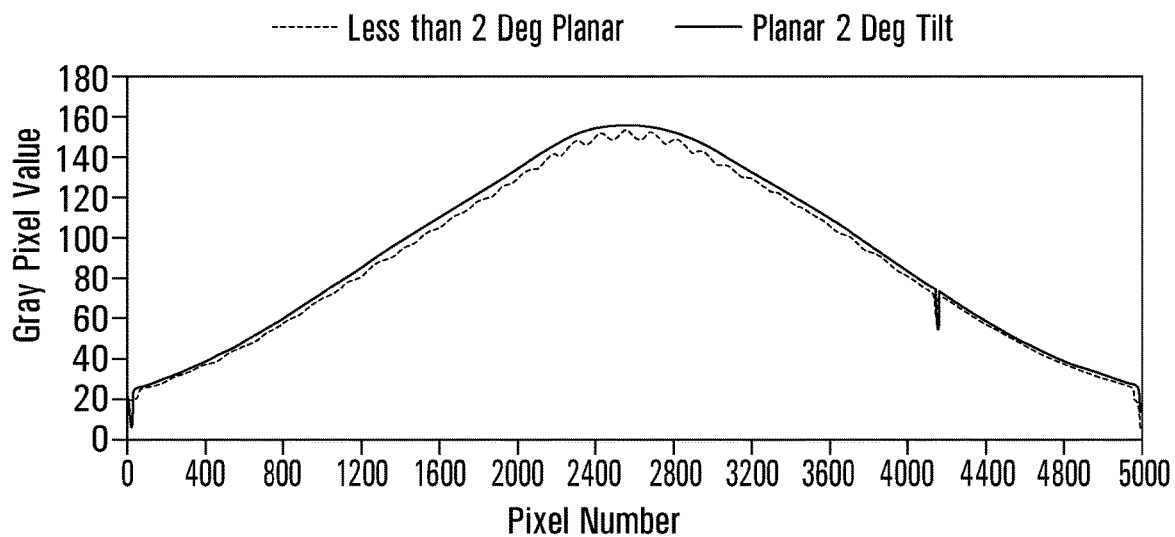
FIG. 5 is a plot of the beam intensity for a beam passing through a device according to FIG. 1C taken along a line passing through the transversal cross-section of the beam that shows a rippling effect in the beam intensity and a plot of the beam intensity for a beam passing through a modified device according to FIG. 1C in which there is a rotation of 2 degrees between LC cells 1+2 and LC cells 3+4 taken along a line passing through the transversal cross-section of the beam that shows absence of the rippling effect in the beam intensity.

As shown in FIG. 2, the beam intensity from the arrangement of FIG. 1A produces a small intensity variation. This same intensity variation appears with the device of FIG. 1C as shown in FIG. 5. By introducing a rotational offset between the two LC sandwiches of FIG. 1A of 5 degrees, as shown in FIG. 3, it has been observed that the ripple in the intensity is greatly mitigated, as shown in FIG. 4. As can be seen, the improvement in the beam intensity profile is significantly improved. This improvement is found to occur beginning at about 2 degrees of rotation, and the rotational offset is best limited to within about 8 degrees.

A similar improvement in this "rippling" in the intensity is seen for the device of FIG. 1C as is also shown in FIG. 5. The improvement in the case of FIG. 5 is achieved with a rotation of 2 degrees between cells 1+2 and cells 3+4. Thus cells 1 and 2 can be left to be orthogonally aligned, and similarly cells 3 and 4 can be left to be orthogonally aligned. The 2 degree rotational offset is thus between cells 2 and 3. Other variations in the rotational offset among cells 1, 2, 3, 4 can be used to achieved the reduction in the intensity rippling effect, for example to align cells 1+4 together and then rotate them with respect to cells 2+3.

The rotational offset can involve a physical rotation of the same electrode pattern on each of the two sandwiches, or it can be a selection of patterns that will provide the rotational offset of the large number of small beam broadening strips disposed between parallel electrodes are active in modulating the beam over the aperture between the two sandwiches or cells 1+2 and 3+4.

The device can be made as illustrated in FIG. 1A with a common substrate between the two LC sandwiches, or it can be made with separate substrates such that each sandwich can be made separately. Providing the rotational offset when the two sandwiches share the same middle substrate can involve printing the electrodes of each sandwich to have the desired rotational offset.

One example of the latter is to arrange the finger electrodes of a rectangular substrate to be at, for example, 88 degrees from the edge of the substrate with the finger electrodes of the adjacent sandwich having, for example, 92 degrees from the edge of the substrate, such that there would be a 4 degree rotational offset between the two sandwiches. When the desired device has a circular aperture, the whole electrode arrangement can be rotated in one or both sandwiches or cell groups, and the combined sandwiches will have the desired rotational offset.

This can be useful when multiple beam broadening devices are made from a larger substrate as a wafer and then singulated into individual single or double sandwiches.

When two identical single sandwich singulated LC devices having rectangular shapes and electrode fingers orthogonal to the sides are used together, the small rotational offset can be provided during a step of bonding the LC sandwich devices together or by the mounting frame that holds the devices together. The singulated devices will thus not be square together. When the electrode patterns are rotated with respect to the sides of the singulated sandwich devices, then they can be bonded together or mounted together to be square.

Figure 6:
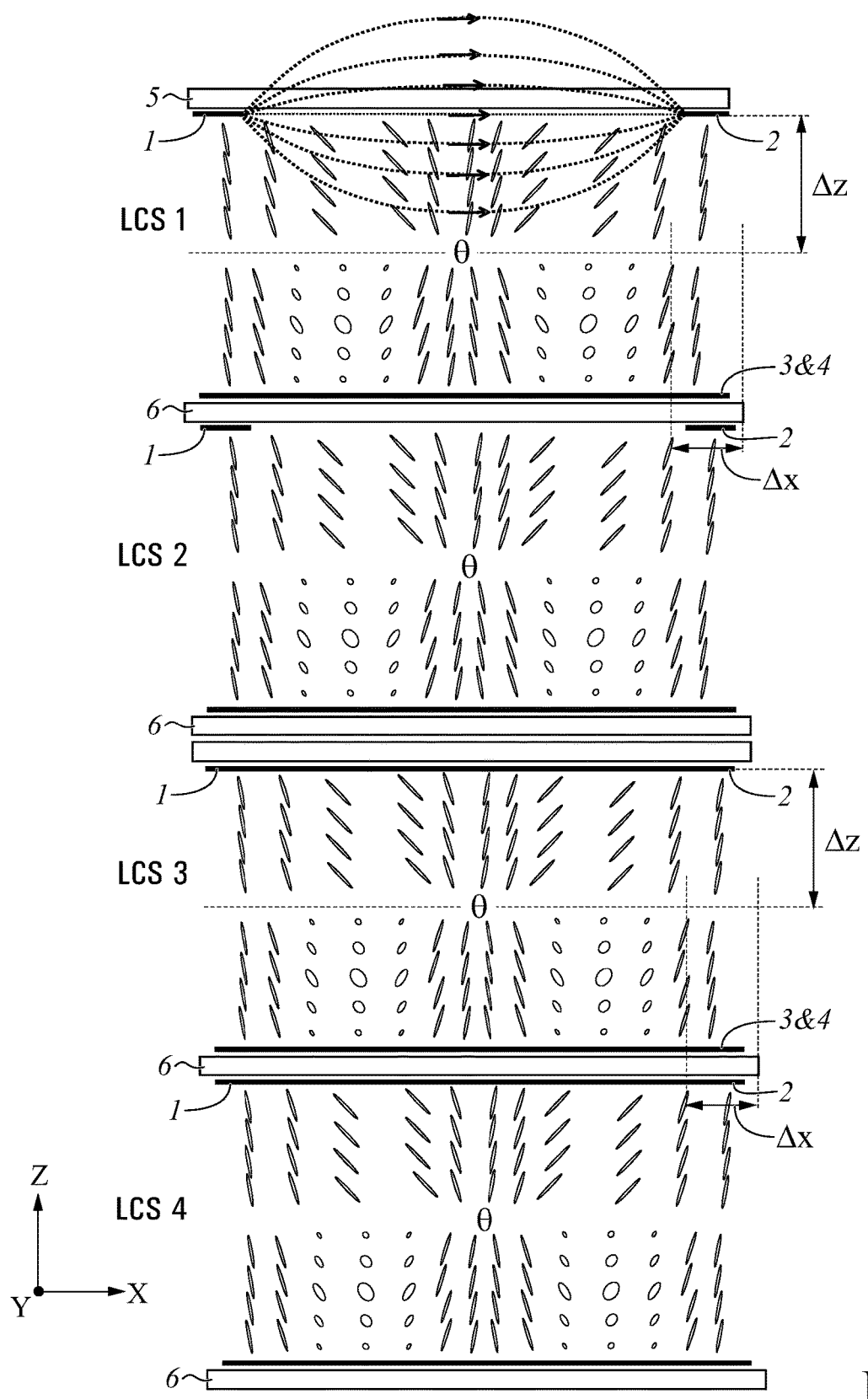
FIG. 6 is a schematic cross-sectional view of four LC sandwiches in which each sandwich has a homeotropic ground state LC alignment with the electrodes of the opposed cell substrates that are orthogonally arranged in which there is a 45 degree rotation between the electrode orientation of the upper two sandwiches and the electrode orientation of the bottom two sandwiches.
Figure 7:
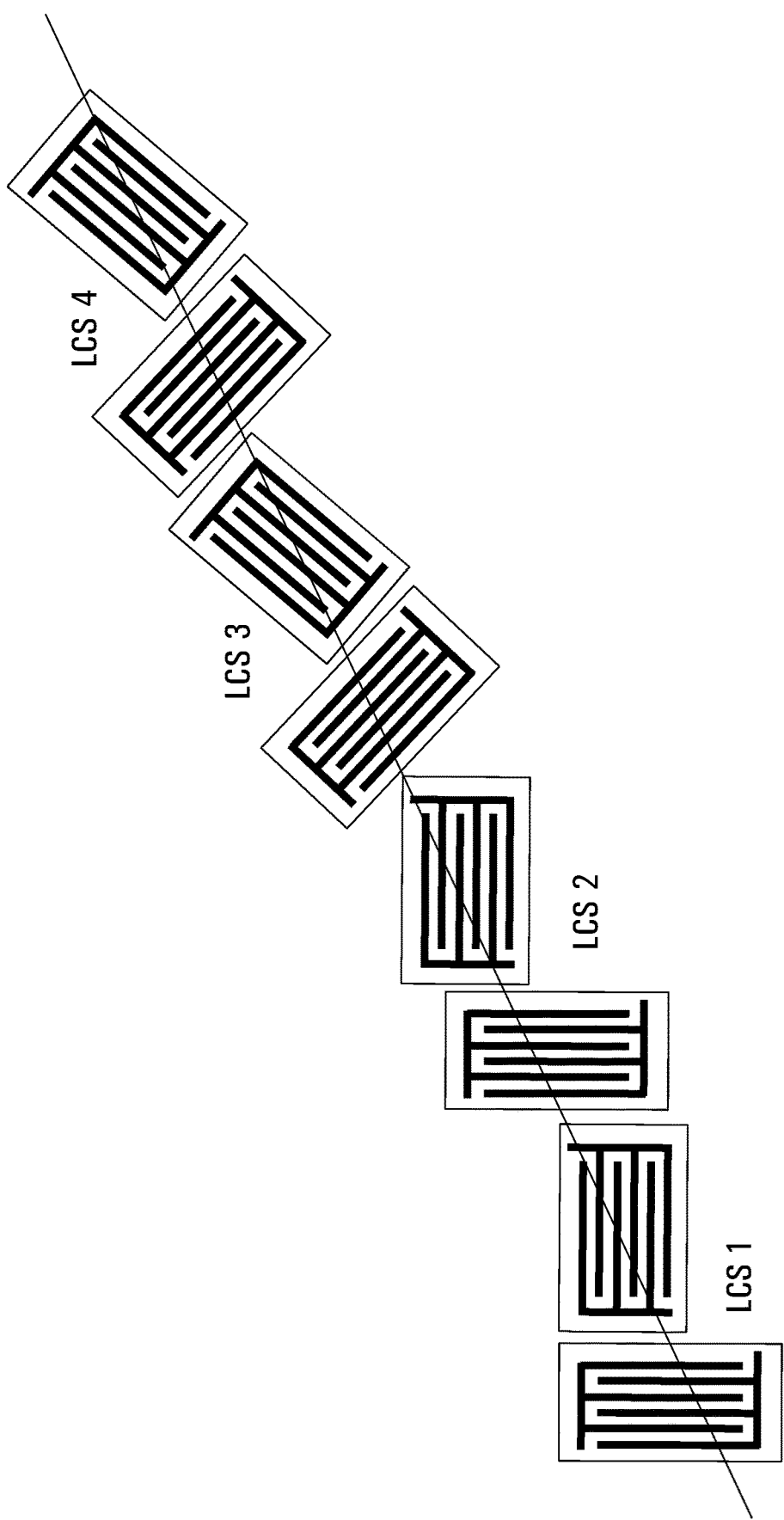
FIG. 7 is a schematic illustration of the electrode orientation of the four sandwiches according to FIG. 6.

The embodiment of FIGS. 6 and 7 illustrate schematically a design in which four sandwiches of LC material having a homeotropic LC ground state and orthogonal electrodes on opposed substrates of each sandwich. As described with reference to FIGS. 1A, 1B and 3, two such sandwiches provides beam broadening in two directions, and the intensity uniformity of the beam broadening can be improved using a small angle rotation between two sandwiches. Applicant has found that an arrangement of four sandwiches, wherein two of the sandwiches have electrodes that are either parallel or orthogonal to each other (whether or not a small angle offset is provided between the two sandwiches) and two of the sandwiches have electrodes that are at 45 degrees to each other (whether or not a small angle offset is provided between the two sandwiches) also improves beam intensity uniformity. It will be appreciated that the ordering of sandwiches LCS1 to LCS4 can be varied from what is illustrated in FIG. 7.

What is claimed is:

1. A liquid crystal (LC) beam broadening device comprising:
    a first LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate;
    a second LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate; and
    wherein the electrode segments of said first LC sandwich are rotationally offset from being parallel or orthogonal with respect to the electrode segments of said second LC sandwich by about 2 to about 8 degrees.

2. The LC beam broadening device as defined in claim 1, wherein said first LC sandwich and said second LC sandwich share a common substrate.

3. The LC beam broadening device as defined in claim 1, wherein said rotational offset is about 5 degrees.

4. A liquid crystal (LC) beam broadening device comprising:
    a first LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate;
    a second LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate;
    a third LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate;
    a fourth LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate; and wherein the electrode segments of said first LC sandwich are rotationally offset from being parallel or orthogonal with respect to the electrode segments of said second LC sandwich by 0 to about 8 degrees, the electrode segments of said third LC sandwich are rotationally offset from being parallel or orthogonal with respect to the electrode segments of said fourth LC sandwich by 0 to about 8 degrees, and the electrode segments of said second LC sandwich are rotationally offset with respect to the electrode segments of said third LC sandwich by approximately 45 degrees.

5. The LC beam broadening device as defined in claim 4, wherein said rotational offset of 0 to 8 degrees is about 2 to about 8 degrees.

6. The LC beam broadening device as defined in claim 5, wherein said rotational offset of 0 to 8 degrees is about 5 degrees.

7. The LC beam broadening device as defined in claim 4, wherein said first LC sandwich, said second LC sandwich, said third LC sandwich and said fourth LC sandwich share at least one common substrate.

8. A liquid crystal (LC) beam broadening device comprising:

four LC cells each having LC material contained within opposed front and back substrates to have a planar aligned ground state orientation, at least one of said substrates having an arrangement of parallel electrode segments for creating a spatial variation of LC orientation within the cells, one each of said four LC cells for each of two polarizations and for each of two orthogonal parallel electrode orientation;

wherein the electrode segments of at least one of said LC cells are rotationally offset from being parallel or orthogonal with respect to the electrode segments of at least one other of said LC cell by about 2 to about 8 degrees.

9. The LC beam broadening device as defined in claim 8, wherein said cells share at least one common substrate.

10. The LC beam broadening device as defined in claim 8, wherein said rotational offset is about 5 degrees.

11. The device as define in claim 8, wherein said planar aligned ground state is at an angle of about 45 degrees with respect to a direction of an electrode orientation in each of said four cells.

* * * * *

UNITED STATES PATENT AND TRADEMARK OFFICE
CERTIFICATE OF CORRECTION

PATENT NO. : 10,845,672 B2
APPLICATION NO. : 16/605399
DATED : November 24, 2020
INVENTOR(S) : Tigran Galstian et al.

Page 1 of 1

It is certified that error appears in the above-identified patent and that said Letters Patent is hereby corrected as shown below:

In the Claims

In Claim 11, at Column 6, Line 18, replace "define" with -- defined --.

Signed and Sealed this
Eighth Day of June, 2021

Drew Hirshfeld
*Performing the Functions and Duties of the
Under Secretary of Commerce for Intellectual Property and
Director of the United States Patent and Trademark Office*